(12) United States Patent
Han et al.

(10) Patent No.: US 9,880,560 B2
(45) Date of Patent: Jan. 30, 2018

(54) VEHICLE AUTO-MOTION CONTROL SYSTEM

(71) Applicant: DEERE & COMPANY, Moline, IL (US)

(72) Inventors: Shufeng Han, Urbandale, IA (US); Christopher D. Turner, Waterloo, IA (US); Bryan K. Buerkle, Cedar Falls, IA (US); Steven A. Duppong, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 269 days.

(21) Appl. No.: 14/027,996

(22) Filed: Sep. 16, 2013

(65) Prior Publication Data
US 2015/0077557 A1     Mar. 19, 2015

(51) Int. Cl.
*G05D 1/02* (2006.01)
*B60R 11/04* (2006.01)
(Continued)

(52) U.S. Cl.
CPC ......... *G05D 1/0246* (2013.01); *A01B 59/062* (2013.01); *A01B 71/063* (2013.01);
(Continued)

(58) Field of Classification Search
None
See application file for complete search history.

(56) References Cited

U.S. PATENT DOCUMENTS

| 7,171,769 B2 | 2/2007 | Schultz et al. |
| 7,568,716 B2 | 8/2009 | Dietz |

(Continued)

FOREIGN PATENT DOCUMENTS

| DE | 10323915 A1 | 2/2005 |
| DE | 102004043761 A1 * | 3/2006 |

(Continued)

OTHER PUBLICATIONS

German Search Report issued in counterpart application No. 10 2014 217 746.4, dated Nov. 13, 2014 (9 pages).
(Continued)

*Primary Examiner* — James M Anderson, II
(74) *Attorney, Agent, or Firm* — Michael Best & Friedrich LLP

(57) ABSTRACT

An automatic control system moves a vehicle so that it can be coupled to an implement. The vehicle has propulsion and steering controls which respond to electronic input signals. A visual target is mounted on the implement. Vehicle mounted cameras generate images of the target. A motion control unit receives and processes the images, and generates vehicle movement commands as a function of the images which are communicated to the propulsion and steering controls. The motion control unit includes a perception engine connected to the cameras, a controller connected to the perception engine, and a vehicle/operator interface which is connected to the controller, and to the propulsion and steering controls. The perception engine captures images from the cameras, un-distorts the images, and searches for the target. If the target is found, the perception engine recovers vehicle posture information and transmits said information to the controller.

10 Claims, 5 Drawing Sheets

(51) Int. Cl.
  *B60D 1/36* (2006.01)
  *B60D 1/62* (2006.01)
  *A01B 59/06* (2006.01)
  *A01B 71/06* (2006.01)
  *A01B 69/00* (2006.01)

(52) U.S. Cl.
  CPC .............. *B60D 1/36* (2013.01); *B60D 1/62* (2013.01); *B60R 11/04* (2013.01); *G05D 1/0225* (2013.01); *G05D 1/0234* (2013.01); *A01B 69/00* (2013.01); *G05D 2201/0201* (2013.01)

(56) References Cited

U.S. PATENT DOCUMENTS

| | | |
|---|---|---|
| 7,777,615 B2 | 8/2010 | Okuda et al. |
| 2005/0074143 A1* | 4/2005 | Kawai ........................ 382/104 |
| 2012/0013742 A1* | 1/2012 | Fairchild ................ B60R 1/00 348/148 |
| 2014/0176713 A1* | 6/2014 | Ho ............................ 348/148 |
| 2014/0270343 A1* | 9/2014 | Sanaullah ......... G06K 9/00302 382/103 |

FOREIGN PATENT DOCUMENTS

| | | | |
|---|---|---|---|
| DE | 102012001380 A1 | 8/2012 | |
| EP | 1862050 B1 | 6/2009 | |
| WO | WO 2012139275 A1 * | 10/2012 | ............... H04N 7/15 |

OTHER PUBLICATIONS

OpenCV, "Open Source Computer Vision", Retrieved from the internet on Oct. 14, 2014: <URL: http://opencv.org> (one page)—(a library of vision-related open source computer programs).

* cited by examiner

VEHICLE AUTO-MOTION CONTROL SYSTEM

FIELD OF THE INVENTION

The present disclosure relates to a system which senses a target on a towed implement and automatically controls the steering and movement of a vehicle to align the vehicle with the towed implement which is to be coupled to the vehicle, such as a wagon or trailer.

BACKGROUND OF THE INVENTION

In the operation of work vehicles, it is often necessary to connect a towed implement to a hitch located at the rear of the vehicle. Or, it may be necessary to position a combine relative to a header unit. The amount of time and effort required to manually align the vehicle to the implement may be significant, depending on the skill of the operator in controlling the vehicle and the ability of the operator to see both the implement tongue and the vehicle drawbar. Particularly with large off-road vehicles, such as an agricultural tractor, the operator's field of view may be obstructed such that the operator may not be able to see either or both the tongue and/or the drawbar. It would be desirable to have a system which has electronic controls which automate the process based on images obtained by a camera or cameras.

SUMMARY

According to an aspect of the present disclosure, a system includes a camera or cameras which are mounted on a vehicle. The cameras produce images of a target on the implement to which the vehicle is to be coupled. An image processor unit processes the images and other information and a control system automatically controls the steering and movement of the vehicle to align the vehicle with the implement, so that the implement can be coupled to the vehicle. The system aligns the hitch of the vehicle with a towed implement, such as a wagon or trailer to be connected. The vehicle automatically stops when the hitch is aligned with the tongue of the towed device. This reduces the skill required of an operator and overcomes field of view limitations.

DETAILED DESCRIPTION OF THE DRAWINGS

Figure 1:
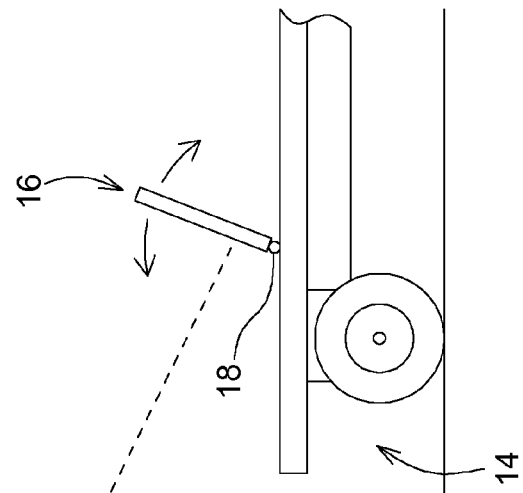
FIG. 1 is a simplified schematic side view of a tractor and implement to be coupled to the tractor.
Figure 1:
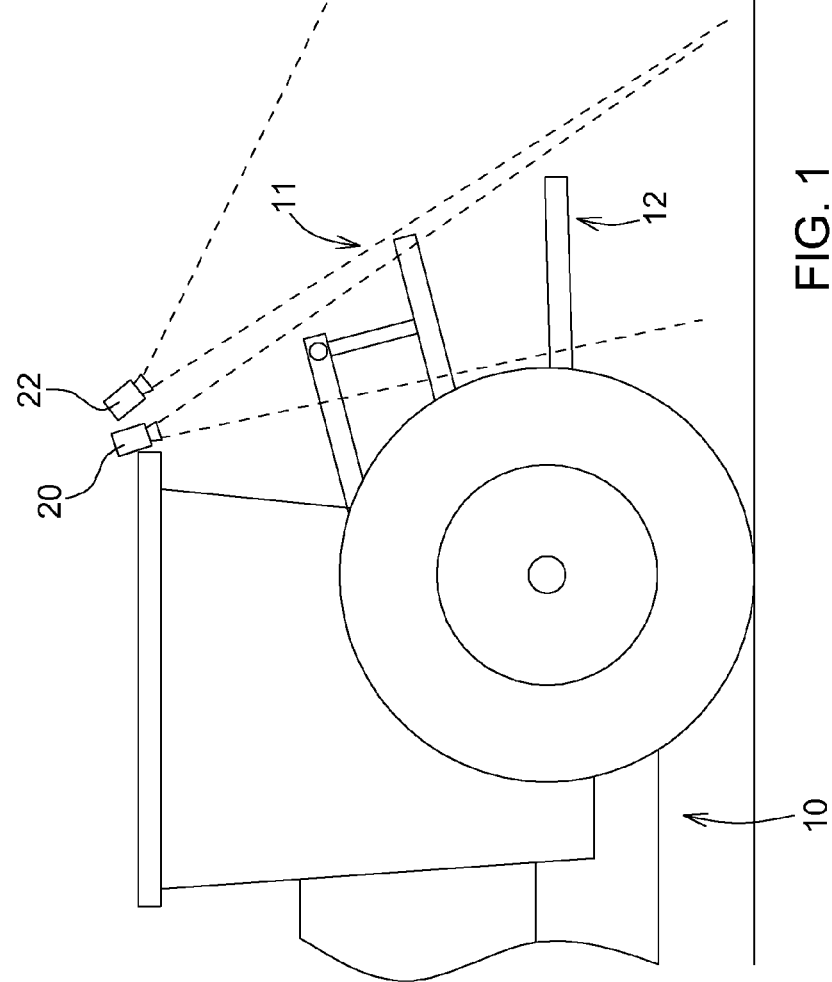

Referring to FIG. 1, a towing vehicle 10, such as an agricultural tractor, has a conventional hitch 11 and/or a drawbar 12 for coupling to an implement 14. A target 16 is mounted on the implement 14 so as to be viewable from the direction of the vehicle 10. The target 16 is preferably pivotally mounted on the implement 14 about a pivot 18 having a pivot axis which is transverse to a fore-and-aft axis of the implement 14. A pair of cameras 20 and 22 are mounted on a rear upper portion of the towing vehicle. Preferably, the cameras include a near-view camera 20 and a far-view camera 22. Preferably, the target 16 has a chessboard pattern for easy identification of corner positions.

Various types of cameras can be used, such as a CCD (charge-coupled device) or a CMOS (complementary metal-oxide-semiconductor). Camera output can be digital or analog, in color or in monochrome. The cameras should have a high dynamic range so they can successfully capture the target image in the lightest and darkest operation conditions. The field-of-view of the camera should be large enough to be able to identify the target at the farthest and closest distances from vehicle to the implement. If a single camera's field-of-view cannot cover the entire distance range, a second camera could be used. Preferably, the camera is a high definition color digital camera.

Figure 2:
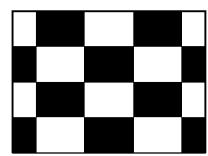
FIG. 2 is a front view of a target which is mounted on the implement of FIG. 1.

The output signal from the camera is converted into digital format by a hardware device and associated software for further image processing. Depending on the output signal of the camera, image capturing hardware can have different variations, such as ADC (analog-to-digital converter), direct physical interface using one of the standard protocols (i.e., Camera Link, FireWire, USB etc.). A digital signal processor (DSP) or other digital processor is used for image processing. As best seen in FIG. 2, the target has a specific design or pattern which can be perceived by the cameras 20 and 22. For example, the pattern may be a checkerboard pattern as shown in FIG. 2.

Figure 3:
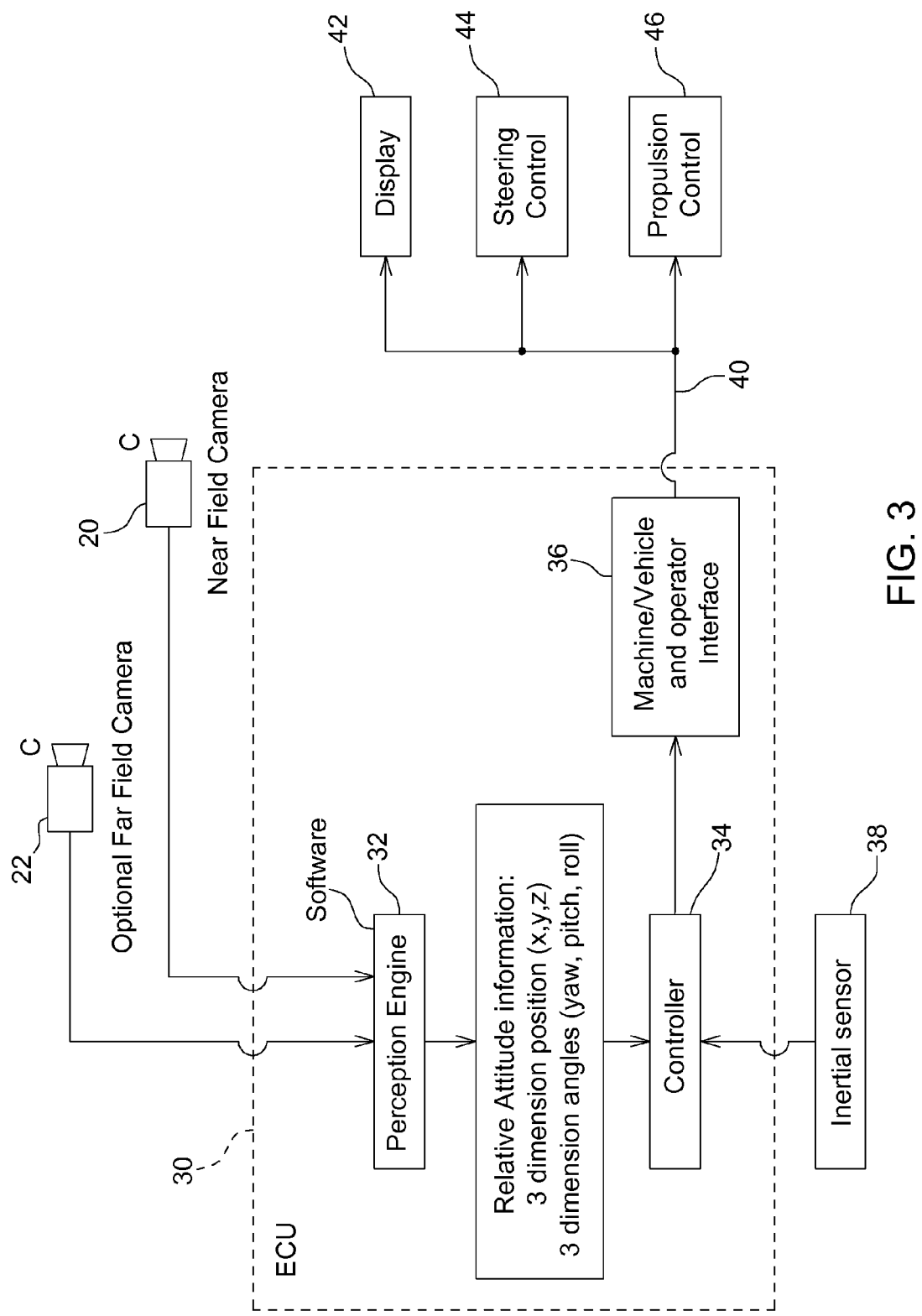
FIG. 3 is schematic block diagram of a control system for controlling the movement of the tractor of FIG. 1.

Referring again to FIG. 3, the near-view camera 20 and the far-view camera 22 are connected to an electronic control unit (ECU) 30. The ECU processes the images from the cameras 20 and 22 and generates tractor movement commands that cause the tractor to move to a position which permits the implement 14 to be coupled to the tractor 10. The ECU 30 is programmed to implement a perception engine 32, a controller 34 and a machine/vehicle and operator interface 36. The perception engine 32 processes the images from the cameras 20 and 22 and generates relative (tractor-implement) attitude information, including 3 dimensional position (x, y, z) and 3 dimensional rotation (yaw, pitch and roll). The relative attitude information is then processed by a controller 34. The output of the controller 34 is further processed by a machine/vehicle and operator interface 36. An optional inertial navigation sensor 38 may provide yaw rate, acceleration and pitch rate information to the controller 34. The inertial sensor 38 may be either internal or external to the ECU 30. A digital data communication bus, such as an ISO11783 or SAE J19239 bus 40 connects the interface 36 to an operator display 42, to a conventional vehicle steering control system 44 which controls the steering of the tractor 10, and to a conventional vehicle propulsion control system 46 which controls the movement of the tractor 10.

The cameras 20 and 22 may be commercially available components which are wired to the ECU 30, or they could be application specific and integrated into an ECU enclosure (not shown). Preferably, the cameras should have the speed and resolution of HDTV. The far-view camera 22 would see out further to identify the implement and begin the automated coupling operation from longer distances and lateral offsets to the implement. The near-view camera 20 will provide higher localization accuracy when the tractor 10 is near the implement 14.

Figure 4:
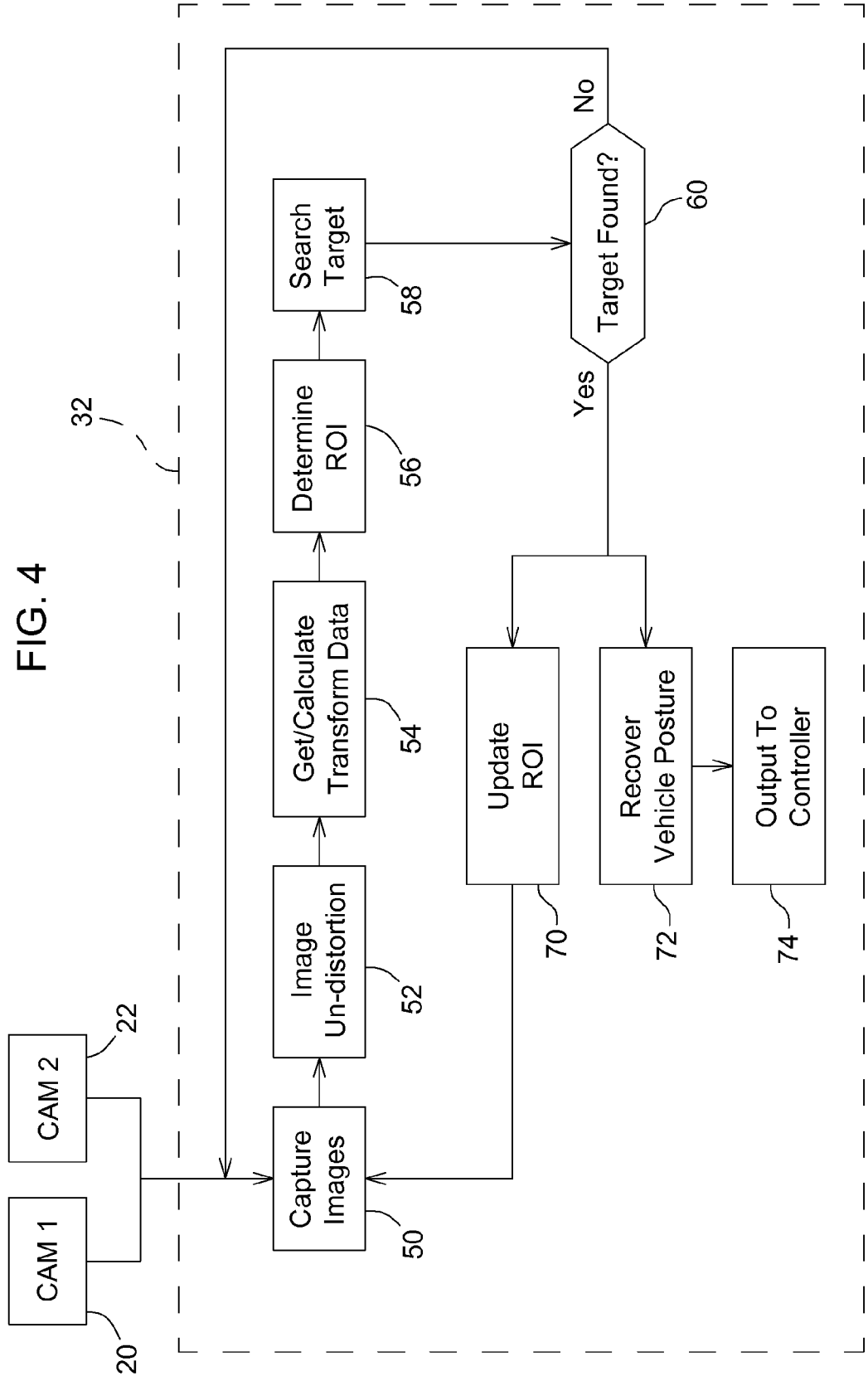
FIG. 4 is schematic block diagram of the perception engine of FIG. 3.

Referring now to FIG. 4, perception engine 32 includes image processing software which is either actively trained or programmed to recognize the size, geometry, and or color of the target 16 located on the implement 14. The image processing software may also be capable normalizing the image error and distortion due camera optics and manufacturing tolerance.

The perception engine 32 includes an image capture process 50 which receives images from the cameras 20 and 22. The images are undistorted by image undistortion process 52. This undistortion process 52 finds the relationship between the image pixel coordinates and the corresponding coordinates in the camera reference frame. This process also corrects the geometric distortion introduced by the optics. Two sets of parameters are used: intrinsic camera parameters and distortion coefficients. These parameters are obtained by a standard camera calibration process using a known image pattern such as a classical black-white chessboard. Intrinsic camera parameters are related only to the camera (focal length f, lens distortion). Intrinsic camera parameters are stored in the storage device and be loaded at the start of the image processing program.

Transform data is obtained and calculated by transform data calculation process 54. This process finds the relationship between the coordinates in the camera reference frame and the corresponding coordinates in the world reference frame (i.e., location and orientation of the target object). This relationship is defined by extrinsic camera parameters (translation and rotation matrices). Extrinsic camera parameters can be stored in the storage device, or they can be obtained during the field operation using a calibration panel. Extrinsic camera parameters are related to camera mounting position and the chosen world reference frame. When the camera is moved during the operation, it must be recalibrated to obtain a new set of extrinsic camera parameters A process 56 determines an initial region of interest (ROI) in the image. Process 58 then searches for the target 16 in the ROI. This process calculates the translation and rotation matrices from the current (relative) position between the vehicle 10 and the target 16. It creates a sub-image based on the region of interest (ROI), converts the sub-image image to black-and-white, finds the pixel coordinates of the corners of the target pattern, refines the pixel coordinates of the corners, estimates extrinsic camera parameters (translation and rotation matrices). Since the target object has a chessboard pattern similar to the one used for calibration, the functions for find the target is very similar to the camera calibration routines in the previous step.

If the target is not found, then step 60 directs the process back to the image capture process 50. If the target is found, then step 60 directs the process in parallel to both processes 70 and 72.

Process 70 updates the ROI and directs the process back to image capture process 50. In order to speed up image processing, the system does not process the entire image from the camera(s). Instead, the system processes only the ROI which only includes the view of the target 16. Since the vehicle 10 is moving relative to the target 16, the field of view (FOV) is constantly changing. Thus, the FOV is determined by the following algorithm:

$$X\text{min\_new} = X\text{min\_old} - dX$$

$$X\text{max\_new} = X\text{max\_old} + dX$$

$$Y\text{min\_new} = Y\text{min\_old} - dY$$

$$Y\text{max\_new} = Y\text{max\_old} + dY$$

$$dX = c^*(X\text{max\_old} - X\text{min\_old})$$

$$dY = c^*(Y\text{max\_old} - Y\text{min\_old}),$$

where c is a constant based on experiment, such as 0.8.

Process 72 analyzes the image which contains the target and generates the tractor position and attitude information. This process finds the position and orientation of the target 16 in the world reference frame. The position and orientation of the target 16 is calculated from the differences between the current translation and rotation and the initial translation and rotation. The position of the target 16 is the 3D world coordinates (with z=0). The orientation of the target 16 includes the rotation angle, the pitch, roll, and yaw angles.

Process 74 outputs this information to the controller 34. The position and orientation of the target 16 (i.e, x, y, rotation angle, the pitch, roll, and yaw angles) are sent to the vehicle steering controller 44 and propulsion controller 46 for automated navigation.

Thus, the perception engine 32 update current ROI based on a previous target position. This improves the output rate to the controller 34 to meet real-time requirements. There is a balance between selecting a large ROI and selecting a smaller ROI around the target. A smaller ROI can improve the image processing speed, but a larger ROI makes it easier to find the next target position. An ROI size which is 120% larger than the target in the horizontal and vertical directions is preferred.

Figure 5:
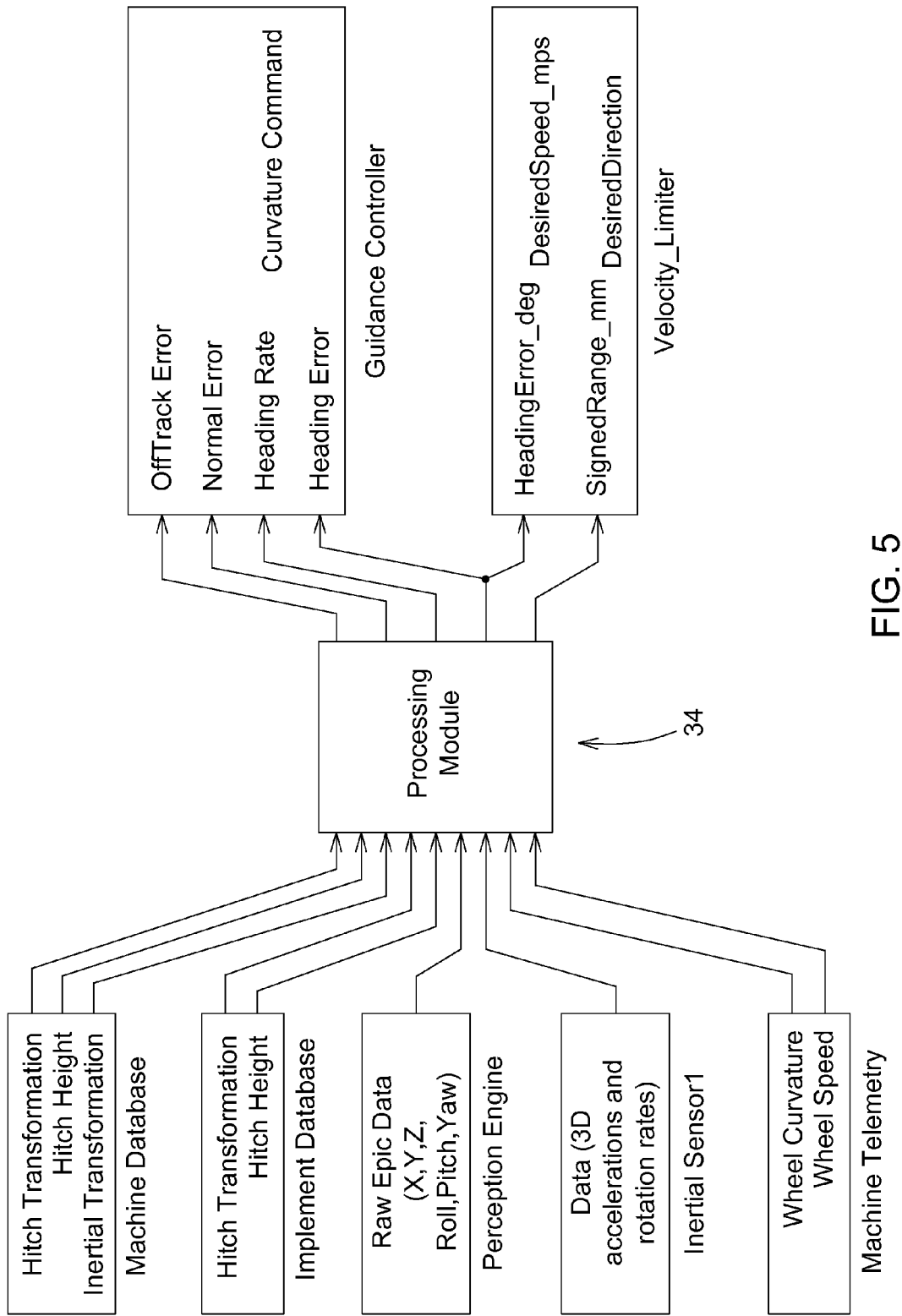
FIG. 5 is a schematic block diagram of the controller of FIG. 3.

Referring now to FIG. 5, the relative position and orientation of the hitch 11 and the implement 14 is read by the controller 34. The controller 34 calculates the distance between the hitch 11 and implement 14, the off track, and heading errors of the tractor 10. This information is processed by the controller 34 to generate the steering and speed command to operate the tractor 10. The distance calculation is used to control the speed and stop the tractor 10 when the hitch 11 is aligned with the implement 14. Off track and heading errors are processed to either position the tractor 10 so that the center axis of the tractor 10 is aligned with the center axis of the implement, while sequentially or simultaneously controlling the convergence of the hitch points for aligning multi-contact point hitches (e.g. ag. tractor three point hitches), or to simply drive the tractor 10 the shortest path to converge the distance between the hitch points for single contact point hitches (drawbar—tongue applications).

The controller 34 receives the following data: vehicle database information including hitch transformation, hitch height, and inertial transformation; implement database information including hitch transformation and hitch height; perception engine information including X, Y, Z position, roll, pitch and yaw; Inertial sensor information including 3D accelerations and rotation rates; and vehicle telemetry information including wheel curvature and wheel speed, and Inertial transformation. The controller 34 processes this information and generates these outputs: guidance controller information including off track error, normal error, heading rate and heading error; and velocity limiter information including heading error, desired speed and desired direction (forward or reverse).

The vehicle database resides on a controller of the tractor 10 on which the auto-motion control system is installed. The database can contain the following information (and more) about the tractor. Hitch transformation is a Euclidian translation and rotation transformation matrices from the focal point on the camera(s) to the pin hole on the drawbar. Hitch height is the magnitude of the vector normal to the world reference ground plane to the center of the hitch. Inertial sensor transformation is the Euclidian translation between the inertial sensor 38 and either the hitch or the camera.

The implement database resides on a controller of the tractor and contains the information about all the implements in the fleet. It can contain the following information (and more) about the implement(s) in the fleet. Hitch transformation is a Euclidian translation and rotation transformation matrices from a point on the target to the center of the implement hitch. Hitch height is a magnitude of the vector normal to the world reference ground plane to the center of the hitch. The perception engine is the vision system data. It contains the x,y,z, roll, pitch, yaw of the vehicle relative to the target 16 on the implement 14.

An optional inertial sensor 38 provides vehicle attitude information, including but not limited to compass heading, 3-dimensional acceleration, and 3-axis rotation rates (roll, pitch, and yaw). The forward or reverse speed of the wheels on the tractor 10, and the left or right steering curvature of the tractor 10 are provided by existing sensors on the vehicle 10. One or more inertial sensor(s) may be employed to improve the stability of the controller 34 during rapid movement and interpolation between perceptions epics. The inertial information may also be used in lieu of perception for intermittent loss of perception.

As a result, the controller 34 performs 3D translations and rotations using calibration data and the output from the perception engine 32 and projects the location of the implement hitch point onto the plane the tractor is driving on to generate a lateral offset and a heading error. The controller 34 preferably generates a steering command based on simultaneously converging offset and heading error to align the hitch points. The controller 34 preferably generates a speed control signal based on a lookup table using distance and heading error as inputs. The controller 34 preferably also is programmed to prevent generation of a speed control signal which could make the tractor "run away" in case of a loss or error in perception information or increase speed while controlling the vehicle.

Figure 6:
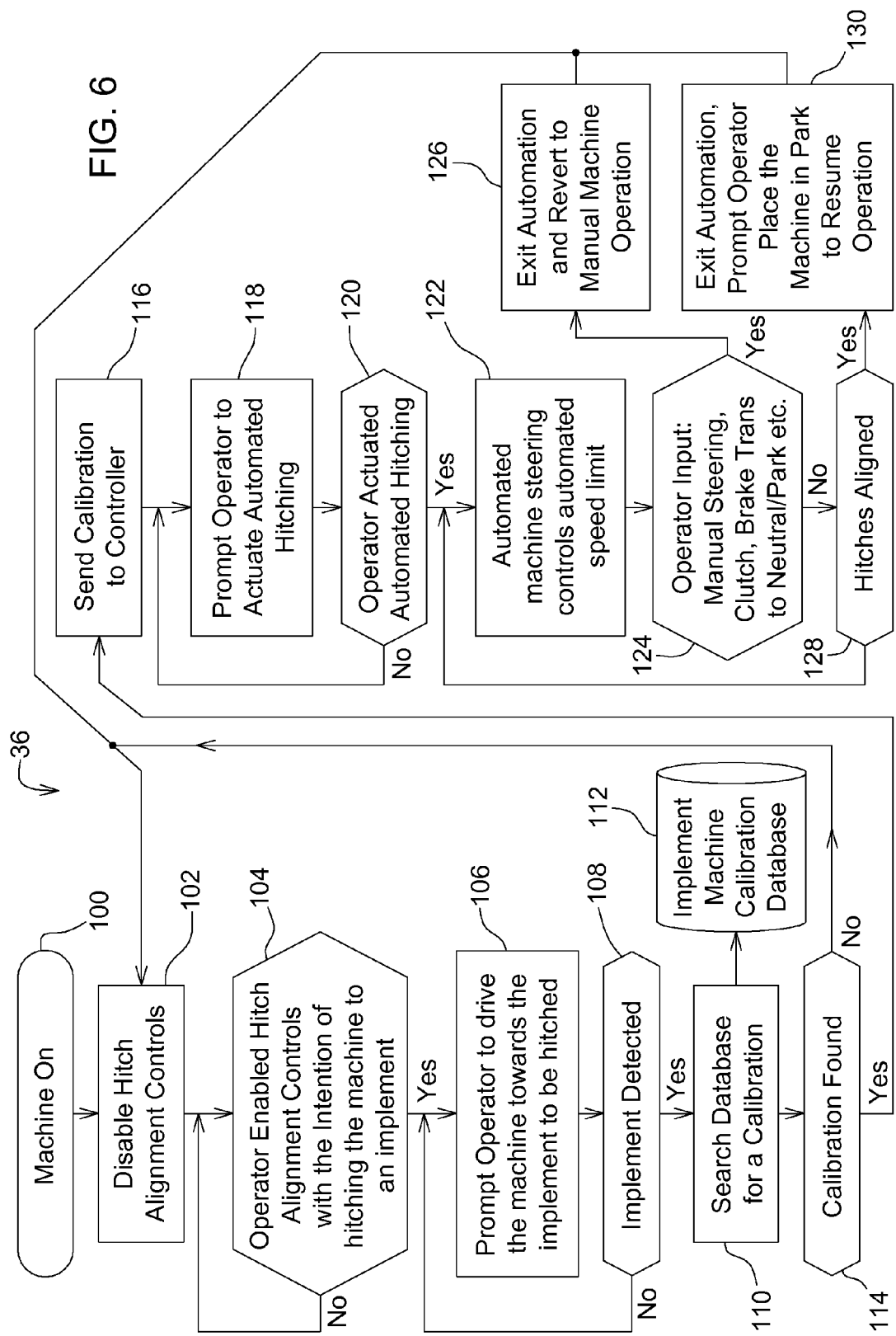
FIG. 6 is a flow chart representation of the operator interface of FIG. 3.

Referring now to FIG. 6, the interface 36 receives (from the controller 34) the output information described previously, and processes that information according to the process steps shown in FIG. 6. If the vehicle is on in step 100, then step 102 disables the hitch and alignment controls. Step 104 prevents further action unless the operator enables the hitch alignment process.

If the operator enables the hitch alignment process, then step 106 prompts the operator to drive the vehicle 10 towards the implement 14.

If step 108 detects the implement, it directs control to step 110, else back to step 106.

Step 110 searches a database 112 for calibration data. If a calibration is found, step 114 directs control to step 116, else back to step 102.

Step 116 sends the calibration data to the controller 34.

Then step 118 prompts the operator to actuate automated hitching.

Step 120 directs control to step 122 if the operator actuates automated hitching, else back to step 118.

Step 122 actuates automated steering controls and an automated speed limit.

Step 124 directs control to step 126 if the auto alignment is active and the operator provides a manual input to a control (turns the steering wheel, depresses the clutch, shifts the transmission, or applies the brakes), thus disabling the automated control. As a result, the operator has priority so that the operator can take control of the machine.

Step 126 exits the automation, returns the tractor 10 to manual control and directs control back to step 102.

Step 128 directs control step 130 if the tractor hitch 12 and the hitch of the implement 14 are aligned, else back to step 102.

Step 130 exits the automation, prompts the operator to place the tractor 10 in park, and directs control back to step 102.

The interface 36 implements a human interface using standard virtual terminal technology, and implements a Class 3 implement vehicle control. Both are defined in standard ISO11783. Alternatively, there are other means of implementing the human interface.

The conversion of the above flow chart into a standard language for implementing the algorithm described by the flow chart in a digital computer or microprocessor, will be evident to one with ordinary skill in the art.

Many other video camera arrangements could be used, such as stereo imaging, automatic tracking, auto focus PTZ (Pan Tilt Zoom) if the feedback from the mechanical lens position and pan tilt had sufficient accuracy. The target 16 may include a code for automatic identification of the implement 14 so that calibration parameters can be automatically loaded from a storage device.

The perception system described herein provides the position of the implement relative to the tractor. The movement of the vehicle detected by by the vision system can be combined with existing on-tractor speed and acceleration sensors, including calculations from GPS. Such a combined signal may be used to improve control of the path the vehicle traverses. This perception system could also be used by auto-guided tractor-implement pairs to perform direction reversals using a reverse motion turn to achieve automated three point turns. The guidance control system can control the path of the vehicle and implement when pushing the implement in reverse. The perception system also provides three dimensional information about the implement in a tractor-implement pair. Ride height of implements or penetration depth of ground engaging implements can be measured by referencing the implements height relative to the tractor operating on the surface. This invention may also be used with an automated hitching system so that no manual effort is required to hitch the tractor when it is aligned with the implement. This invention also applies to both single point (e.g. drawbar) and multiple point (e.g. three point) hitches for implements that hitch anywhere on the vehicle (front, rear, over and under).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An automatic control system for moving a vehicle with respect to an implement to be attached to the vehicle, the vehicle having propulsion and steering controls which respond to electronic input signals and the implement including a visual target mounted to the implement, the automatic control system comprising:
a manual movement control;
an operator interface;
a camera mounted on the vehicle, the camera generating images; and
a motion control unit which receives the images from the camera, the motion control unit configured to
generate vehicle movement and command signals based on user input through the manual movement control while operating in a manual machine operation mode,
process said images generated by the camera,
generate a prompt on the operator interface in response to detecting the visual target in an image from the camera while operating in the manual machine operation mode, the prompt instructing an operator to actuate automated hitching,
apply a perception engine and automatically generate vehicle movement command signals as a function of vehicle posture information determined based at least in part on the images only when automated hitching is actuated by the operator in response to the generated prompt on the operator interface, and
communicate the command signals to the propulsion and steering controls, wherein, in response to receiving the command signals, the propulsion and steering controls move the vehicle to a coupling position so that the implement can be coupled to the vehicle,
wherein the motion control unit is configured to process said images by applying the perception engine that
determines a region of interest in an image generated by the camera and searches for the visual target within the region of interest;
when the visual target is found in the image, determines the vehicle posture information based on a location of the visual target in the image and updates the region of interest, wherein the updated region of interest is larger than the visual target in the image and smaller than an entire image from the camera; and
after the visual target is found, continues to process subsequent images from the camera by searching for the visual target only within a region of interest updated based on a location of the visual target in a previous image, and determining vehicle posture information based on a detected location of the visual target in each image,
wherein a field of view of the region of interest relative to the entire image from the camera is determined based on the field of view of the region of interest for the previous image and increases as the motion control unit causes the vehicle to move closer to the coupling position.

2. The control system of claim 1, wherein:
the perception engine updates the region of interest to be approximately 120% larger than the target in each direction.

3. The control system of claim 2, wherein:
the target displays a chessboard pattern.

4. The control system of claim 3, wherein the camera includes a near-view camera and a far-view camera.

5. A coupling alignment system for moving a vehicle into a coupling position with respect to an implement to be attached to the vehicle, the coupling alignment system comprising an electronic control unit configured to receive a first image from a camera positioned on the vehicle,
search the first image for a visual target within a defined region of interest for the camera, the defined region of interest including a field of view that is larger than the visual target in the first image and smaller than an entire area of the first image, the visual target being mounted to the implement,
generate vehicle movement command signals based at least in part on the location of the visual target in the first image, wherein the vehicle movement command signals cause the vehicle to move relative to the visual target when received by one or more vehicle actuators,
update the defined region of interest for the camera based on a detected location of the visual target in the first image and based on a size of the field of view of the defined region of interest used for the first image such that a size of a field of view of the updated defined region of interest increases as the vehicle is moved closer to the visual target,
receive a second image from the camera after the vehicle has moved relative to the visual target, and
search the second image for the visual target only within the updated defined region of interest for the camera.

6. An automatic control system for moving a vehicle with respect to an implement to be attached to the vehicle, the vehicle having propulsion and steering controls which respond to electronic input signals and the implement including a visual target mounted to the implement, the automatic control system comprising:
a camera mounted on the vehicle, the camera generating images; and
a motion control unit which receives the images from the camera, the motion control unit configured to
process said images,
generate vehicle movement command signals as a function of vehicle posture information determined based at least in part on the images, and
communicate the command signals to the propulsion and steering controls, wherein, in response to receiving the command signals, the propulsion and steering controls move the vehicle to a coupling position so that the implement can be coupled to the vehicle,
wherein the motion control unit is configured to process said images by applying a perception engine that
determines a region of interest in an image generated by the camera and searches for the visual target within the region of interest;
when the visual target is found in the image, determines the vehicle posture information based on a location of the visual target in the image and updates the region of interest, wherein the updated region of interest is larger than the visual target in the image and smaller than an entire image from the camera; and
after the visual target is found, continues to process subsequent images from the camera by searching for the visual target only within a region of interest updated based on a location of the visual target in a previous image, and determining vehicle posture information based on a detected location of the visual target in each image,
wherein a field of view of the region of interest relative to the entire image from the camera is determined based on the field of view of the region of interest for the previous image and increases as the motion control unit causes the vehicle to move closer to the coupling position, wherein the perception engine updates the region of interest by determining a field of view for the updated region of interest based on the field of view for the region of interest used for the previous image, wherein $$X_{min\_new} = X_{min\_old} - dX;$$

$$X_{max\_new} = X_{max\_old} + dX;$$

$$Y_{min\_new} = Y_{min\_old} - dY;$$

$$Y_{max\_new} = X_{max\_old} + dY;$$

$$dX = c * (X_{max\_old} - X_{min\_old});$$

$$dY = c * (Y_{max\_old} - Y_{min\_old});$$

wherein $X_{max\_old}$ and $X_{min\_old}$ define the field of view on an X-axis for the region of interest used for the previous image, wherein $Y_{max\_old}$ and $Y_{min\_old}$ define the field of view on a Y-axis for the region of interest used for the previous image, wherein $X_{max\_new}$ and $X_{min\_new}$ define the field of view on an X-axis for the updated region of interest, wherein $Y_{max\_new}$ and $Y_{min\_new}$ define the field of view on a Y-axis for the updated region of interest, and wherein c is a calibration constant.

7. The automatic control system of claim 6, further comprising:

a manual movement control; and an operator interface, wherein the motion control unit is further configured to
communicate command signals to the propulsion and steering controls based on user input through the manual movement control while operating in a manual machine operation mode, generate a prompt on the operator interface instructing an operator to actuate automated hitching in response to detecting the visual target in an image from the camera while operating in the manual machine operation mode, and apply the perception engine and automatically generate vehicle movement command signals based on the vehicle position information determined based at least in part on the images only after automated hitching is actuated by the operator in response to the generated prompt on the operator interface.

8. The automatic control system of claim 6, wherein the calibration constant c is equal to 0.8.

9. The automatic control system of claim 6, wherein:
the target displays a chessboard pattern.

10. The automatic control system of claim 6, wherein the camera includes a near-view camera and a far-view camera.

* * * * *